United States Patent [19]

Yamashita

[11] Patent Number: 5,713,022
[45] Date of Patent: Jan. 27, 1998

[54] IMAGE DATA SUPPLY SYSTEM FOR SELECTIVELY SUPPLYING A NUMBER OF IMAGE DATA

[75] Inventor: Hitoshi Yamashita, Tokyo, Japan

[73] Assignee: Fuji Photo Film Co., Ltd., Kanagawa, Japan

[21] Appl. No.: 979,244

[22] Filed: Nov. 20, 1992

[30] Foreign Application Priority Data

Nov. 22, 1991 [JP] Japan ................. 3-355493

[51] Int. Cl.$^6$ ................................. G06F 13/00
[52] U.S. Cl. ............... 395/615; 395/934; 382/305
[58] Field of Search ...................... 395/425, 600, 395/250, 615; 371/10.1; 364/282.1, 283.1; 382/305

[56] References Cited

U.S. PATENT DOCUMENTS

| | | | |
|---|---|---|---|
| 4,829,453 | 5/1989 | Katsuta et al. | 382/305 |
| 4,941,125 | 7/1990 | Boyne | 395/600 |
| 4,969,204 | 11/1990 | Melnychuck et al. | 382/56 |
| 5,053,948 | 10/1991 | DeClute et al. | 395/600 |
| 5,058,002 | 10/1991 | Nakamura et al. | 395/600 |
| 5,148,932 | 9/1992 | Gordon et al. | 371/10.1 |
| 5,440,401 | 8/1995 | Parulski et al. | 358/342 |
| 5,463,771 | 10/1995 | Sotoyanagi et al. | 395/600 |

FOREIGN PATENT DOCUMENTS

| | | |
|---|---|---|
| 476836 | 3/1992 | Japan . |
| 4353628 | 12/1992 | Japan . |

OTHER PUBLICATIONS

"The Imaging Makeover: Imaging is predicted to alter the face of computing as much as PCs did in the '80s", by Debra Sheer Haverson, MIDRANGE Systems, v4, n21, p18(6), Oct. 1991.

*Primary Examiner*—Wayne Amsbury
*Assistant Examiner*—Hosain T. Alam

[57] ABSTRACT

An image data supply system using optical disks each storing high resolution image data has an image data supply device which supplies a particular one or ones of the image data to a user terminal. The image data supply device constitutes a data base for searching which stores in a hard disk reduced versions of original images stored in the optical disks and search information associated with the reduced versions. When a request in the form of key words is sent from the user terminal to the image data supply device, a data base supervisor built in the supply device searches the data base of the hard disk and drives an auto changer and a compact disk reader to read desired image data immediately. The image data is sent to the user terminal over a high speed communication network.

33 Claims, 5 Drawing Sheets

Fig. 3

| REDUCED IMAGE | CD No. | OBJECT | LOCATION | DATA |
|---|---|---|---|---|
| | IN | HI | HH | HU |
| | | | | |
| | | | | |
| | | | | |
| | | | | |

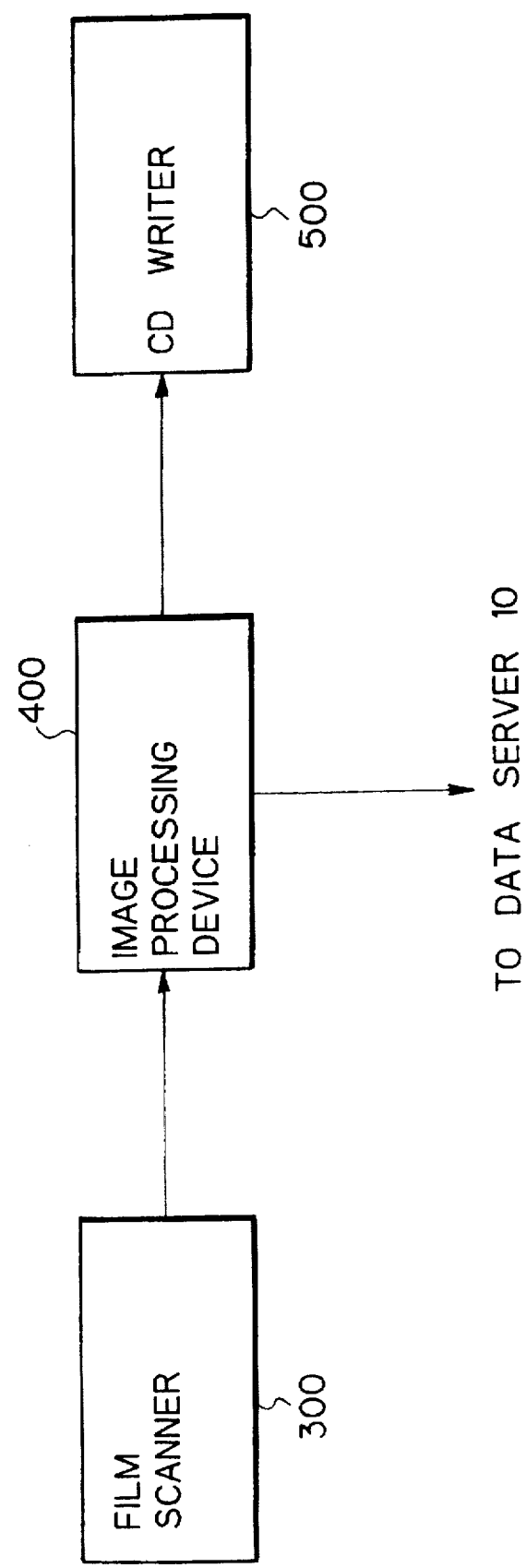

IMAGE DATA SUPPLY SYSTEM FOR SELECTIVELY SUPPLYING A NUMBER OF IMAGE DATA

BACKGROUND OF THE INVENTION

1. Field of the Invention

The present invention relates to an image data supply system for supplying image data to users and, more particularly, to an image data supply system capable of supplying users with image data produced from negative films of silver halide photosensitive material type of photography and stored in optical disks.

2. Description of the Background Art

Image data recorded in films of silver halide photosensitive material type of photography have higher resolution and tonality than image data recorded by other recording systems, e.g., electrophotography. It has been customary to preserve images recorded in films in the form of negative films or prints. However, in parallel with the spread of computer systems, there is an increasing demand for an implementation which allows such high resolution image data to be inputted to a computer and manipulated for a desired purpose. On the other hand, a photo CD (Compact Disk) system has recently been reported which records image data produced from negative films in a miniature and high density CD so as to allow them to be reproduced by a computer system. The photo CD system includes a film scanner for reading image data of high resolution, e.g., 2048×3027 pixels obtained from films of silver halide photosensitive material type of photography. The image data from the film scanner am sequentially written on a photo CD via a computer or similar image processing device. At this instant, the image processing device generates reduced versions of the plurality of image data to be recorded in the photo CD, arranges the reduced image data in a single frame to produce an index image, and records the index image in the photo CD together with the original images. Afterwards, the index image may be reproduced by a CD reader to see which image data are stored in the photo CD. For example, a plurality of reduced images are recorded in a photo CD together with original images by a procedure shown and described in U.S. Pat. No. 4,969,204.

However, the problem with the state of the art photo CD system is that the user has to load a CD player with photo CDs one by one to search for a desired one of image data stored therein, resulting in a troublesome operation. This is especially true when the number of photo CDs is great. Another problem is that although the image data stored in photo CDs may be available for the general public, each person cannot receive desired image data without taking the trouble of going to a particular place stocked with the photo CD image libraries for the general public.

SUMMARY OF THE INVENTION

It is therefore an object of the present invention to provide an image data supply system allowing a user to search a number of image data stored in photo CDs efficiently without going to a particular place and, therefore, supplying the user with desired image data efficiently.

In accordance with the present invention, an image data supply system for selecting desired image data out of a number of image data recorded in at least one recording medium and supplying the desired image data to a terminal unit has an image data supply device for supplying image data to the terminal unit over a high speed communication network. The image data supply device comprises a search information storing section for storing reduced images each being associated with particular one of the image data stored in the recording medium, and search information associated with the reduced images, a searching section for searching for one of the image data recorded in the recording medium on the basis of the search information stored in the search information storing section in response to a request from the terminal unit, a medium selecting section for selecting, when the image data are recorded in a plurality of recording media, one of the recording media which stores the image data searched for by the searching section, and a supplying section for reading the image data searched for by the searching section out of the recording medium selected by the medium selecting section, and supplying the image data to the terminal unit over the high speed communication network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings, which are given by way of illustration only and thus are not limitative of the present invention and in which:

FIG. 3 shows a specific format available with a search data base in the embodiment;

FIG. 5 is a block diagram schematically showing a specific construction of a recording system included in any of the illustrative embodiments.

DESCRIPTION OF THE PREFERRED EMBODIMENS

Figure 1:
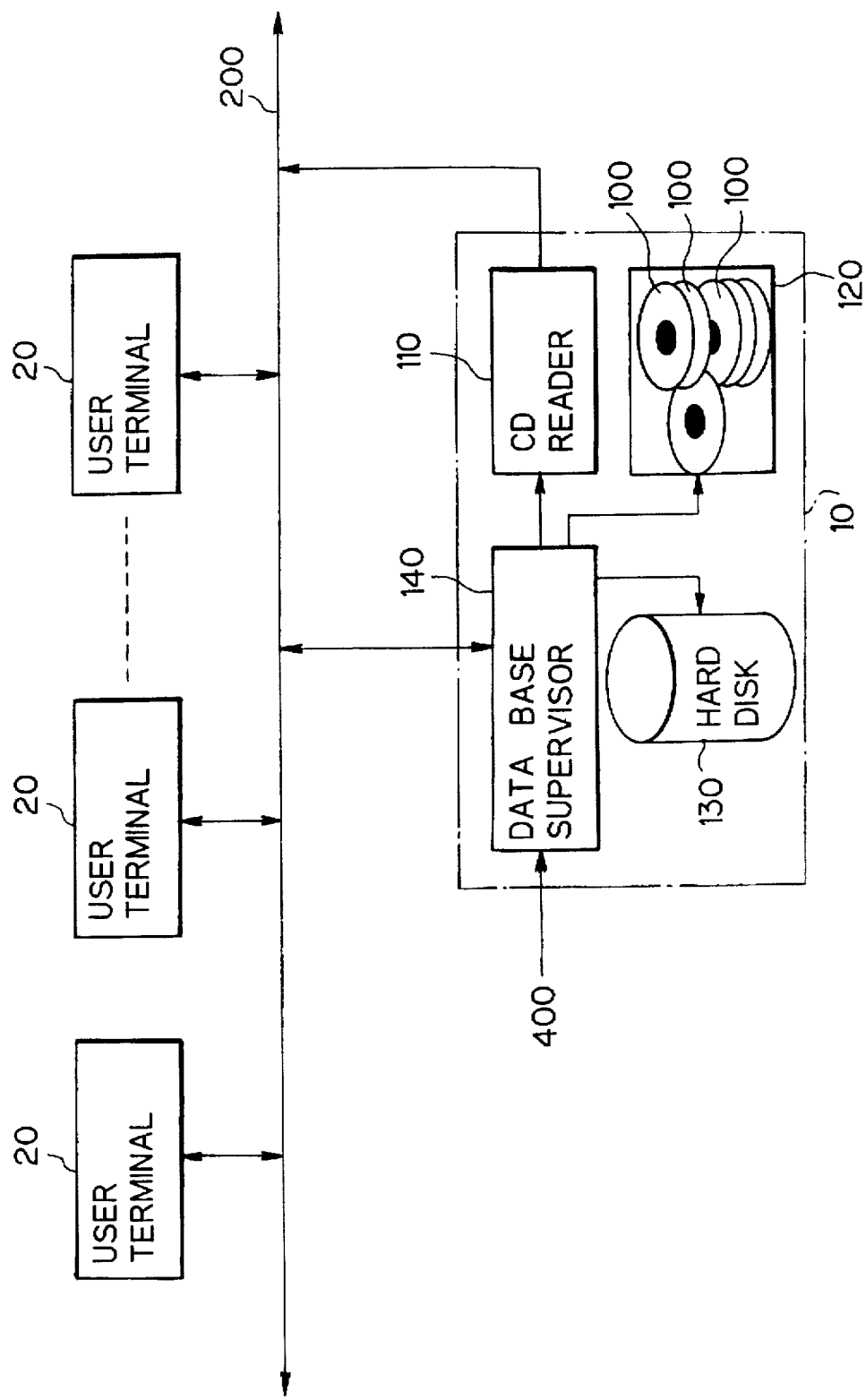
FIG. 1 is a block diagram schematically showing an image data supply system embodying the present invention.

Referring to FIG. 1 of the drawings, an image data supply system embodying the present invention is shown. As shown, the system has an image data supply device 10 including a plurality of optical disks 100. The optical disks 100 each store image data representative of a plurality of images. A terminal unit 20 is situated at each user's residence and connected to the image data supply device 10 by a high speed communication network 200. As any of the users designates particular image data on the terminal unit 20, the video data supply device 10 selects the designated image data and sends it to the terminal 20 over the high speed communication network 200.

The optical disks 100, or so-called photo CDs, each store image data read out of, for example, 35 millimeter negative film. The image data supply device 10 plays the role of a data server for selecting image data specified by the user and sending it to the user terminal. Specifically, the image data supply device 10 has a CD reader 110 for reading image data out of the disks 100 which are mounted thereon one at a time, an auto changer 120 for loading the CD reader 110 with a necessary one of the disks 100, a hard disk 130 storing information for searching for a desired one of the image data stored in the disks 100, and a data base supervisor 140 for searching for desired image data on the basis of the search information stored in the hard disk 130.

The disks 100 are implemented as postscript type CDs and may advantageously be provided with a light-absorptive recording layer disclosed in Japanese Patent Application No. 191257/1990 of the same applicant as the present invention. For example, the disk 100 has a base made of polycarbonate or similar plastic, a light-absorptive layer formed on the substrate and containing a coloring matter as taught in the above Laid-Open Publication, and a light-reflective layer formed on the light-absorptive layer and made of gold (Au) or similar metal. To record image data in such a disk 100, use may advantageously be made of an optical disk recording device capable of writing image data in the disk 100 at a speed higher than a conventional speed, e.g., at a linear velocity higher than 2.4 meters per second, as proposed in Japanese Patent Application No. 153817/1991.

FIG. 5 shows a recording system using a recording device having the above-mentioned capability. As shown, the recording system has a film scanner 300 for reading image data out of a 35 millimeter negative film, a personal computer or similar image processing device 400, and a CD writer 500 which may be implemented by the above-stated disk recording device. The film scanner 300 reads a film to generate image data of high resolution, i.e., 2048×3027 pixels. The image data is routed through the image processing device 400 to the optical disk 100 of CD standards. At this instant, the image processing device 400 reduces the image data to, for example, 1/256 and arranges the reduced image data in a single frame to generate an index image. The index image is recorded in a photo CD together with the original video data representative of independent images. At the same time, the image processing device 400 sends the reduced data to the data base included in the image data supply device 10, FIG. 1, for the searching purpose. The CDs 100 storing the image data are each numbered and mounted on the auto changer 120, FIG. 1.

Referring again to FIG. 1, the auto changer 120 selects a particular one of the disks 100 mounted thereon according to a command from the data base supervisor 140, and then loads it on the CD reader 110 automatically. The CD reader 110 is a playback device implemented with the Sony-Philips' standards and capable of reading desired image data out of the disk 100 loaded thereon in response to a command from the data base supervisor 140. The data base supervisor 140 plays the role of a searching system for adding search information to each of the reduced image data received from the image processing device 400, storing the image data and search information in the hard disk 130 as a search data base, and searching the image data by referencing the search information.

Figure 2:
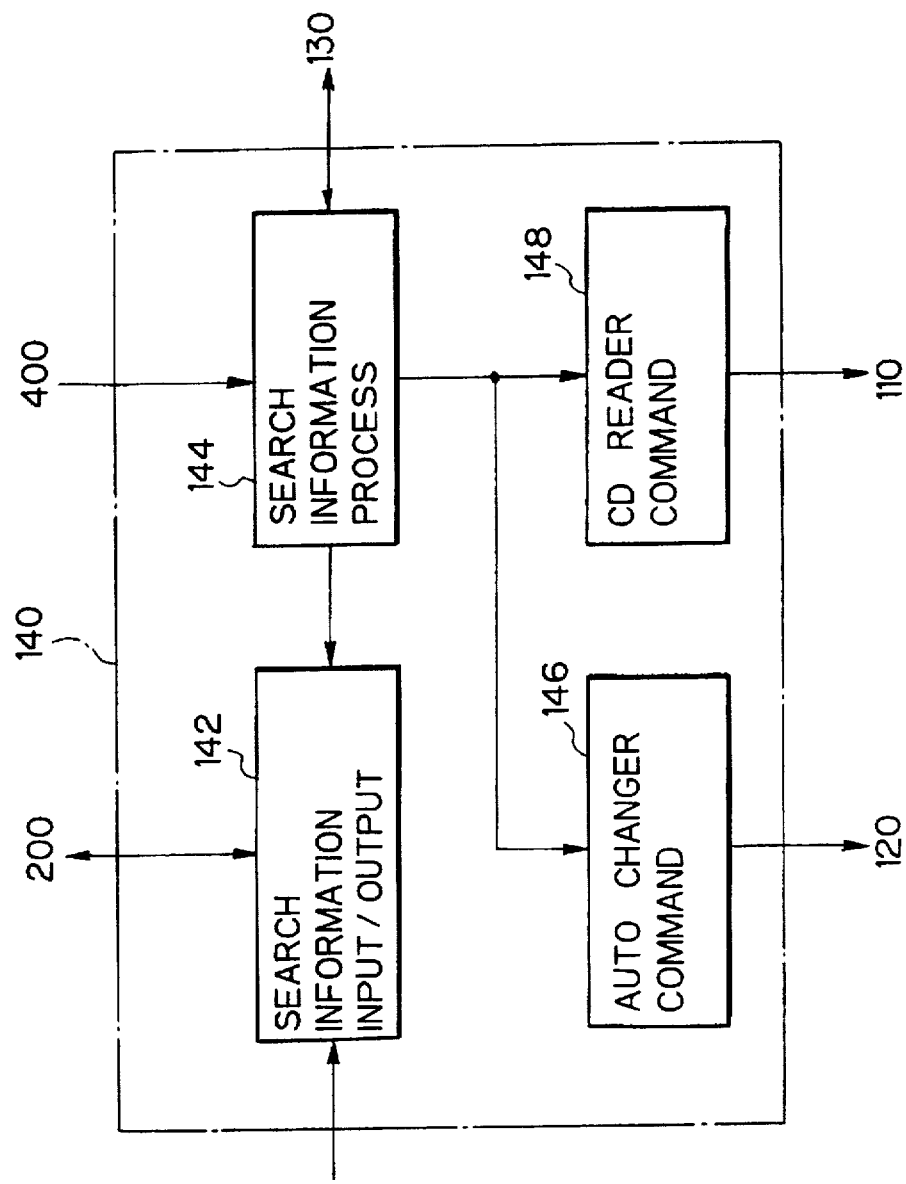
FIG. 2 is a block diagram schematically showing a specific construction of a data base supervisor included in the embodiment.
Figure 3:
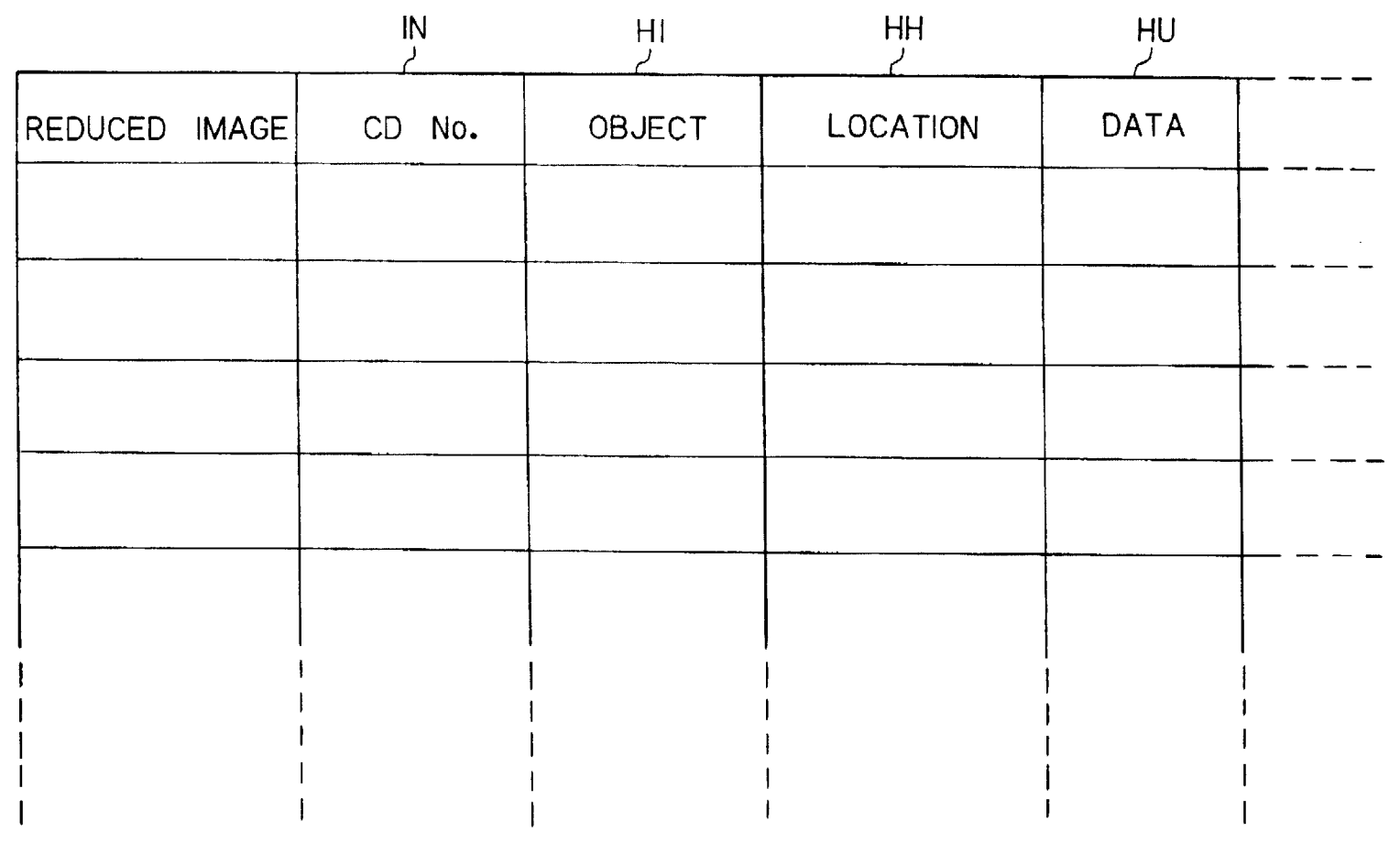

Specifically, as shown in FIG. 2, the data base supervisor 140 is constituted by a search information input/output section 142, a search information processing section 144, an auto changer command section 146, and a CD reader command section 148. The search data input/output section 142 is connected to, for example, a keyboard associated with the image data supply device 10 and to the high speed communication network 200. When an optical disk or disks 100, are additionally loaded on the auto changer 120, the search information input/output section 142 receives from the keyboard search information to be added to the reduced data which have been received from the image processing device 400 of the recording system. In addition, when any one of the users searches for desired image data, the input/output section 142 serves as an interface for interchanging search data with the user terminal of interest. The search information processing section 144 constitutes a data base producing unit for adding search information to each of the reduced data received from the image processing device 400, and writing them in the hard disk 130 in a predetermined format to produce a data base. At the same time, the processing section 144 serves as a search processor for searching, in response to a request from any of the user terminals 20, the data base formed in the hard disk 130 and informing the user terminal 20 of the disk number, file number and so forth associated with the desired image dam. As shown in FIG. 3 specifically, the search information may include the disk numbers (CD Nos.) IN of the added disks 100, the names HI given to the images or objects recorded, the locations HH of shots, and the dates HU of the shots. The auto changer command section 146 generates a signal for selecting a particular disk 100 designated by the disk number sent from the search information processing section 144 and feeding it to the auto changer 120. Likewise, the CD reader command section 148 generates a command signal for reading desired image data designated by the file number sent from the search information processing section 144 out of the disk 100 loaded on the CD reader 110 and feeding it to the CD reader 110.

The high speed communication network 200 is constituted by, for example, a high speed token ring network having a trunk implemented by an FDDI (Fiber Distributed Data Interface). The FDDI network has a transmission rate of 100 megabits per second and may have low speed cables connected to the branches thereof. In such a case, signals input and output from the cables are transmitted at high speed over the trunk and distributed to the individual devices via the branches. The user terminals 20 are constituted by, for example, personal computers situated at the respective residences and connected to the communication network 200. The user terminals 20 each access the image data supply device 10 over the communication 200 to receive desired image data. Each user terminal 20 is provided with a display for displaying image data received from the image data supply device 10.

The image data supply system having the above construction is operated as follows.

Assume that one of the users accesses the image data supply device 10 by manipulating the terminal unit 20. Then, the terminal unit 20 displays a message urging the user to select either a search mode using an index image or a search mode using key words. It is firstly assumed that the user has selected the search mode using key words and has entered, among the search information shown in FIG. 3, the object name HI and the location HH and date HU of the shot as key words. On receiving such search information over the high speed network 200, the image data supply device 10 causes the search information processing section 144 of the data base supervisor 140 to search the data base of the hard disk 130. As a result, the reduced image data of interest and the associated disk number IN are read out of the data base and sent to the user terminal 20 over the communication network 200. On confirming the reduced image and the disk number IN on the display, the user sends an acknowledge signal to the image data supply device 10. In response, the search information processing section 144 feeds the disk number and the file number to the auto changer command section 146 and the CD reader command section 148, respectively. Then, the auto changer command section 146 drives the auto changer 120 by a command signal. The auto changer 120 selects one of the optical disks 100 which stores the desired image data and loads it on the CD reader 110. Subsequently, as the CD reader command section 148 feeds a command signal to the CD reader 110, the CD reader 110 reads the desired image data out of the disk 100 mounted thereon. The image data is sent to the user terminal 20 over the communication network 200.

On the other hand, assume that the user has selected the search mode using an index image. Then, the search information processing section 144 reads the index image constituted by a plurality of reduced images out of the hard disk 130 and sends it to the terminal unit 20 over the high speed network 200. In response, the user enters a command designating a desired one of the reduced images or image data on the terminal unit 20. On receiving the command, the search information processing section 144 delivers a command to the auto changer 120 to drive it. As a result, the auto changer 120 selects the disk 100 of the desired number and loads it on the CD reader 110. Subsequently, the CD reader command section 148 generates a command signal for starting up the CD reader 110 and reading the desired image data out of the disk 100. In response, the CD reader 110 reproduces the desired image data from the disk 100. The image data is sent to the terminal unit 20 over the communication network 200. Upon confirming the received image data, the user returns an acknowledge signal to the image data supply device 10. If the user desires another image data in addition to the image data received, the user selects it out of the reduced images received before. Then, the image data supply device 10 will send the next image data to the terminal unit 20 by the above procedure. Assuming that the reduced images received do not include a desired one, the user again sends key words requesting another index image made up of reduced images, selects the desired image data out of the index image, and then receives the image data from the image data supply device 10. On receiving all of the desired image data, the user sends an end message to the image signal supply device 10 with the result that the terminal unit 20 is disconnected from the communication network 200.

As stated above, the illustrative embodiment is capable of supplying the user terminals 20 with high resolution image data produced from 35 millimeter negative film immediately whenever requested by the users. This allows the users to load such image data in their own computers and use them for any desired purpose immediately. It is noteworthy that the users can search for desired image data by watching an index image, i.e., a group of reduced image data, instead of searching the original images one by one. Further, the users can readily search the original images on the basis of the search information associated with the respective reduced data.

Figure 4:
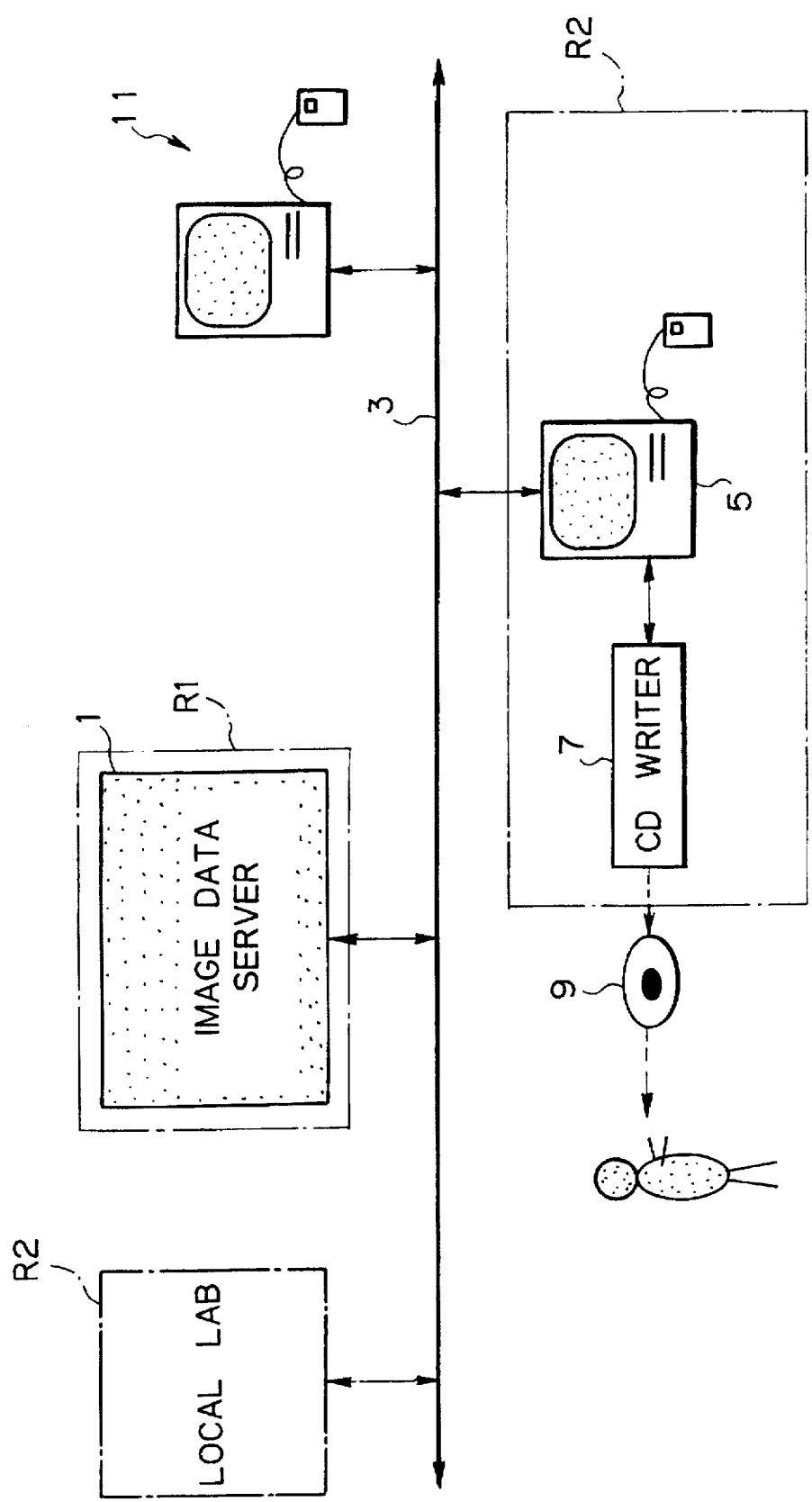
FIG. 4 is a block diagram schematically showing an alternative embodiment of the present invention.

Referring to FIG. 4, an alternative embodiment of the present invention is shown. This embodiment is capable of supplying image data even to users who do not have the terminal units 20 of the previous embodiment which are connected to the communication network 200. As shown in FIG. 4, an image data supply device 1 similar in construction to the device 10, FIG. 1, is situated at a particular or central processing laboratory R1. The image data supply device 1 is connected by a high speed communication network 3 to work stations 5 which are situated at respective common or local laboratories R2. A CD writer 7 is connected to each work station 5 to write image data received from the image data supply device 1 over the network 3 in an optical disk or photo CD 9.

In operation, at any of the local laboratories R2, key words for a search are entered at the work station 5 to receive reduced images from the image data supply device 1 located at the central laboratory R1 over the communication network 3, as with the previously described user terminal 20. If the reduced images include a desired one, a selection signal is sent from the work station 5 to the image data supply device 1. In response, the image data supply device 1 searches for the desired image data out of a plurality of disks 100 and sends it to the work station 5, as in the previous embodiment. On receiving the desired image data, the work station 5 transfers the data to the CD writer 7 to write the image data in the photo CD 9 in a predetermined format. Such a procedure is repeated until a plurality of desired image data have been fully written in the photo CD 9. The photo CD 9 storing the image data is handed over to a person expected to receive it. The person or customer, thereof, can bring the photo CD 9 home and read the image data by a player to store them in a computer. In this manner, the embodiment is capable of supplying image data even to persons who are not connected to the image data supply system.

In the embodiments shown and described, the reduced images are filed at the search data base together with disk numbers IN, object names HI, locations HH and dates HU of shots and so forth. However, the present invention is also practicable with any other suitable file format.

In summary, it will be seen that the present invention provides an image data supply system capable of selecting image data desired by a user and supplying it immediately. The user can select desired image data by watching an index image containing reduced versions of a plurality of original images, instead of checking the original images one by one. Moreover, the user can readily search original images on the basis of search information each being associated with particular one of the reduced image data.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An image data supply system comprising:
   an image data supply device for selecting a desired one of original frames of image data recorded in one of a plurality of recording media and for supplying the selected frame of image data to a terminal unit,
   the plurality of recording media each having reduced image data of the original frames of image data recorded thereon, the reduced image data being representative of reduced image frames into which the original frames of image data recorded on the plurality of recording media are reduced; and
   a high speed communication network, connecting said image data supply device to the terminal unit, for conveying thereon image data and search information between said image data supply device and the terminal unit,
   said image data supply device comprising
      search information storing means for storing in a storage medium provided separately from the plurality of recording media the reduced image data and search information of the original frames of image data, the reduced image data stored in said storage medium being the same as the reduced image data recorded in the plurality of recording media, searching means for searching said storage medium for the reduced image data and the search information associated therewith in response to a request provided over said high speed communication network from the terminal unit to locate one of the plurality of recording media in which an original frame of image data associated with the request is recorded, medium selecting means for detachably loading therewith the plurality of recording media and, operative in response to said searching means, for selecting one of the plurality of recording media which contains the original frame of image data located by said searching means, and supplying means, operative in response to said searching means, for reading out the original frame of image data located by said searching means from the recording medium selected by said medium selecting means and for supplying the original frame of image data thus read out to the terminal unit over said high speed communication network.

2. The image data supply system in accordance with claim 1, wherein said high speed communication network comprises a token ring network having a trunk implemented by a fiber distributed data interface.

3. The image data supply system in accordance with claim 1, wherein the terminal unit is connected to a recording device which records the original frame of image data sent from said supplying means in another recording medium.

4. The image data supply system in accordance with claim 1, wherein the plurality of recording media comprise optical disks in which high resolution image data produced from a negative film of silver halide photography is recorded as the original frames of image data.

5. The image data supply system in accordance with claim 1, wherein the search information includes location information representative of locations where the original frames of image data are recorded in the plurality of recording media, said searching means (a) reads out, in response to the request provided from the terminal unit, the reduced image data and the location information from said storage medium, (b) sends the reduced image data to the terminal unit, (c) supplies, upon receiving from the terminal unit a selection signal designating a desired one of the reduced image frames, a medium selection signal to said medium selecting means to cause said medium selecting means to select one of the plurality of recording media which stores the original frame of image data from which the desired one of the reduced image frames is produced, and (d) feeds an image data selection signal to said supplying means to cause said supplying means to read out from the selected one of the plurality of recording media the original frame of image data from which the desired one of the reduced image frames is produced.

6. The image data supply system in accordance with claim 5, wherein said searching means sends the location information together with the reduced image data to the terminal unit.

7. The image data supply system in accordance with claim 1, wherein said searching means sends the search information together with the reduced image data to the terminal unit.

8. The image data supply system in accordance with claim 7, wherein the request provided from the terminal unit includes a key word associated with a desired one of the original frames of image data, said searching means reading out, on the basis of the key word, the reduced image data and the search information from said storage medium which corresponds to the key word.

9. The image data supply system in accordance with claim 1, wherein the plurality of recording media comprise optical disks in which high resolution image data produced from images visually recorded on an image recording medium are recorded as the original frames of image data.

10. The image data supply system in accordance with claim 1, wherein the reduced image data represents index images generated when the original frames of image data are recorded in the plurality of recording media, the index images being stored in said storage medium with the search information added thereto.

11. The image data supply system of claim 1, wherein the plurality of recording media are detachable.

12. The image data supply system of claim 11, wherein the plurality of recording media are optical disks.

13. The image data supply system of claim 1, wherein the original frames of image data recorded on the plurality of recording media comprise high resolution image data.

14. A method of supplying image data comprising:

providing a plurality of recording media in which original frames of image data and reduced image data are recorded, the reduced image data being representative of reduced image frames into which the original frames of image data recorded in the plurality of recording media are reduced;

storing in a search information storage provided separately from the plurality of recording media the reduced image data and search information of the original frames of image data, the reduced image data being the same as the reduced image data recorded in the plurality of recording media;

searching the search information storage for the reduced image data and the search information associated therewith which are stored therein in response to a request provided over a high speed communication network from a terminal unit, to locate one of the plurality of recording media in which an original frame of image data associated with the request is recorded;

selecting one of the plurality of recording media which contains the original frame of image data thus searched for;

reading out the original frame of image data thus searched for from the selected recording medium; and supplying the original frame of image data thus read out to the terminal unit over the high speed communication network.

15. The method of supplying image data in accordance with claim 14, wherein the search information includes location information representative of locations where the original frames of image data are recorded in the plurality of recording media, the method further comprising:

reading out, in response to the request provided from the terminal unit, the location information from the search information storage together with the reduced image data;

sending the reduced image data to the terminal unit over the high speed communication network;

sending a selection signal designating a desired one of the reduced image frames from the terminal unit over the high speed communication network; and selecting one of the plurality of recording media which stores the original frame of image data from which the desired one of the reduced image frame is produced, in accordance with the selection signal.

16. The method of supplying image data in accordance with claim 15, further comprising sending the location information together with the reduced image data to the terminal unit over the high speed communication network.

17. The method of supplying image data of claim 14, wherein said step of providing comprises providing a plurality of detachable recording media.

18. The method of supplying image data of claim 17, wherein the plurality of detachable recording media comprise optical disks.

19. The method of supplying image data in accordance with claim 14, further comprising:
   producing the reduced image data as representing index images when recording the original frames of image data in the plurality of recording media; and
   storing the reduced image data thus produced in the search information storage with the search information added thereto.

20. The method of supplying image data of claim 14, wherein the original frames of image data are recorded in the plurality of recording media as high resolution image data.

21. The method of supplying image data in accordance with claim 14, further comprising sending the search information together with the reduced image data to the terminal unit over the high speed communication network.

22. The method of supplying image data in accordance with claim 21, wherein the request provided from the terminal unit includes a key word associated with a desired one of the original frames of image data, the method further comprising:
   receiving the key word from the terminal unit; and
   reading out the reduced image data and the search information from the search information storage on the basis of the received key word.

23. The method of supplying image data in accordance with claim 14, further comprising producing high resolution image data from images visually recorded on an image recording medium and recording the high resolution image data as the original frames of image data on the plurality of recording media, which are optical disks.

24. The method of supplying image data in accordance with claim 23, wherein the image recording medium is a negative film of silver halide photography.

25. An image data supply system comprising:
   an image data supply device for selecting a desired one of original frames of image data recorded in one of a plurality of recording media and for supplying the selected frame of image data to a terminal unit, the plurality of recording media each having reduced image data of the original frames of image data recorded thereon, the reduced image data being representative of reduced image frames into which the original frames of image data recorded in the plurality of recording media are reduced; and
   a high speed communication network, connecting said image data supply device to the terminal unit, for conveying thereon image data and search information between said image data supply device and the terminal unit,
   said image data supply device comprising
      a search information controller for storing in a search information memory provided separately from the plurality of recording media the reduced image data and search information of the original frames of image data, the reduced image data stored in said search information memory being the same as the reduced image data recorded in the plurality of recording media,
      a searching device for searching said search information memory for the reduced image data and the search information associated therewith which are stored therein in response to a request provided over said high speed communication network from the terminal unit to locate one of the plurality of recording media in which an original frame of image data associated with the request is recorded,
      a medium selecting device for detachably loading therewith the plurality of recording media and, operative in response to said searching device, for selecting one of the plurality of recording media which contains the original frame of image data located by said searching device, and
      a supplying circuit, operative in response to said searching device, for reading out the original frame of image data located by said searching device from the recording medium selected by said medium selecting device and for supplying the original frame of image data thus read out to the terminal unit over said high speed communication network.

26. The image data supply system of claim 25, wherein the plurality of recording media are detachable.

27. The image data supply system of claim 26, wherein the plurality of recording media are optical disks.

28. The image data supply system of claim 25, wherein the original frames of image data recorded on the plurality of recording media comprise high resolution image data.

29. An image data supply system comprising:
   scanning means for reading frames of image data;
   image processing means, coupled to said scanning means, for processing the read frames of image data to produce frames of original image data and for reducing the read frames of image data to produce frames of reduced image data;
   recording means, coupled to said image processing means, for recording the frames of original image data and the frames of reduced image data into respective ones of a plurality of recording media;
   search information storage means, coupled to said image processing means, for storing in a search information memory the frames of reduced image data and search information indicative of the frames of the original image data recorded in the plurality of recording media which correspond to the frames of reduced image data; and
   searching means, coupled to said search information storage memory, for identifying in which of the plurality of recording media a frame of original image data is recorded based on the reduced image data and the search information stored in said search information storage memory.

30. The image data supply system of claim 29, wherein the plurality of recording media are detachable.

31. The image data supply system of claim 30, wherein the plurality of recording media are optical disks.

32. The image data supply system of claim 29, wherein said scanning means reads the frames of image data from negative film of silver halide photography, the frames of image data being high resolution image data.

33. The image data supply system of claim 29, wherein the frames of reduced image data are recorded in the plurality of recording media as index images.

* * * * *